March 6, 1962  H. PROHASKA  3,023,446

LOCKING DEVICE FOR WINDSHIELD WIPER BLADE

Filed April 26, 1960

INVENTOR.
Hans Prohaska
BY
Dicke, Craig and Freudenberg

United States Patent Office 3,023,446
Patented Mar. 6, 1962

3,023,446
LOCKING DEVICE FOR WINDSHIELD
WIPER BLADE
Hans Prohaska, Bietigheim, Wurttemberg, Germany, assignor to SWF-Spezialfabrik für Autozubehör Gustav Rau G.m.b.H., Bietigheim, Wurttemberg, Germany
Filed Apr. 26, 1960, Ser. No. 24,819
Claims priority, application Germany Apr. 29, 1959
4 Claims. (Cl. 15—250.32)

The present invention relates to a device for releasably locking a windshield wiper blade to a wiper arm.

It is an object of the invention to provide a locking device which permits the wiper blade and wiper arm to be securely locked to each other, and which does not require any tools either for the locking or unlocking operations.

A further object of the invention is to provide a very simple and inexpensive locking device consisting of a resilient plastic which is mounted within the blade carrier and includes a resilient member integral with the device which is provided with a locking projection which is adapted to engage into an aperture in the end of the wiper arm.

According to the invention, the locking device for connecting the wiper blade to the wiper arm is pivotally mounted within the U-shaped profile of the blade carrier, and the back of the latter is provided with an aperture through which the wiper arm may be inserted into the locking device. The entire locking device consists of a single piece of plastic, one part of which is resilient and has a toothlike projection on its upper surface and a longer upright projection on its end. The toothlike projection is adapted to snap into the aperture in the end of the wiper arm to lock the same to the blade carrier. In order to unlock the tooth from the aperture in the wiper arm, it is merely necessary to pivot the blade carrier and the wiper arm relative to each other to a certain extreme position. By such a pivoting movement, the upright projection on the end of the resilient part of the locking device will at first engage with the inner surface of the back of the blade carrier and, when the pivoting movement is continued, the resilient part will be bent downwardly until the tooth will be withdrawn from the aperture, so that the wiper arm may then be pulled out of the blade carrier.

According to another feature of the invention, the tooth on the resilient part of the locking device is preferably inclined at the side from which the wiper arm is inserted so that the tip of the wiper arm, when engaging with the inclined edge of the tooth during the insertion of the wiper arm, will bend the resilient part until the aperture in the end of the wiper arm coincides with the position of the tooth so that the latter can then snap automatically into the aperture. According to a further feature of the invention, the upright projection on the end of the resilient part is spaced at such a distance from the tooth that it will serve as a stop member to limit the depth of insertion of the wiper arm into the blade carrier. The recess formed on the upper surface of the resilient part intermediate the upright projection and the tooth preferably has a width corresponding to the width between the end surface of the wiper arm and the edge of the aperture so that when this end portion of the wiper arm has snapped into this recess, the arm will be immovably locked to the locking device.

These and other objects, features, and advantages of the present invention will become further apparent from the following detailed description thereof, particularly when the same is read with reference to the accompanying drawings, in which—

FIGURE 3 shows a view similar to FIGURE 2, but with the wiper arm in the unlocked position within the blade carrier; while

Figure 1:
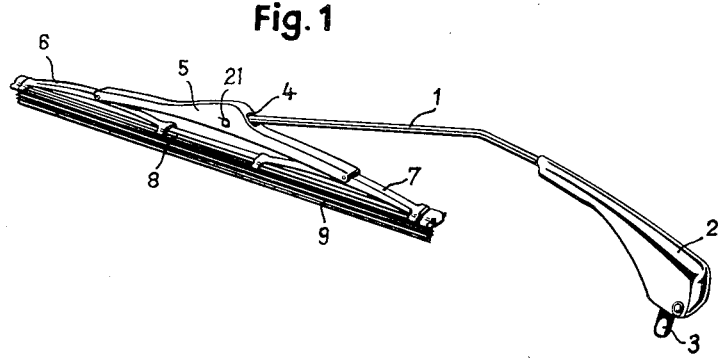
FIGURE 1 shows a perspective view of a windshield wiper arm together with a wiper blade for a curved windshield.

Referring to the drawings, the wiper arm 1 is provided at one end with a head 2 which is secured to the shaft 3 which is driven by the windshield wiper motor, not shown. At its other end, wiper arm 1 is inserted into an aperture 4 in the back of blade carrier 5 which is of an inverted U-shaped cross section and is pivotably connected at its ends to the intermediate yokes 6 and 7 which, in turn, have clawlike ends gripping a pair of spring rails 8 carrying the rubber blade 9.

Figure 2:
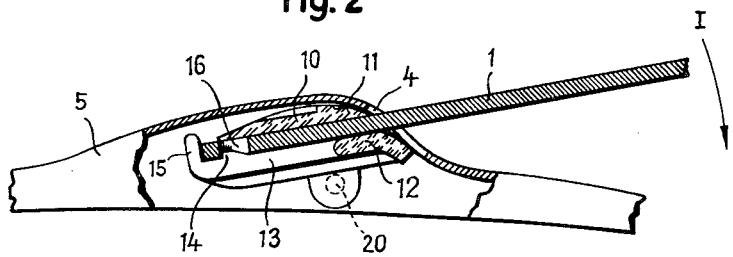
FIGURE 2 shows a side view, partly in cross section, of the central part of the wiper blade carrier with the wiper arm in the locking position therein.
Figure 3:
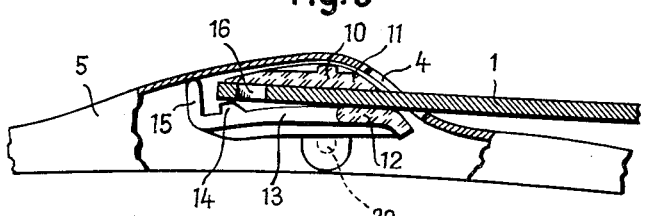

According to the invention, as shown particularly in FIGURES 2 and 3, the dome-shaped central part of blade carrier 5 contains the device 10 for locking the wiper arm 1 to blade carrier 5. This locking device 10 consists of a single piece of plastic and it is pivotably mounted between the side walls of blade carrier 5. The body of this locking device contains a longitudinal channel 10' between the upper part 11 and the lower part 12 into which the end of wiper arm 1, after passing through aperture 4 in the back of the blade carrier, is inserted. The lower part 12 has integrally connected thereto a resilient member 13 which has a toothlike projection 14 on its upper side and an end portion 15 which extends at a substantially right angle in the upward direction. Tooth 14 is adapted to engage into an aperture 16 in the end portion of wiper arm 1 when wiper arm 1 has been inserted so far into locking device 10 that its front end engages with the end portion 15 of member 13.

Figure 4:
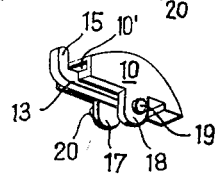
FIGURE 4 shows a perspective detail view of the locking device removed from the blade carrier.

As illustrated particularly in FIGURE 4, locking device 10 has a pair of lugs 17 and 18, each of which carries a short pivot pin 19 or 20. These pivot pins are inserted into apertures 21 in the side walls of blade carrier 5, as indicated in FIGURE 1.

If wiper arm 1 is pivoted from the locked position, as shown in FIGURE 2, in the direction of arrow I, the angular end portion 15 will at first engage with the inner surface of the back of blade carrier 5, and if wiper arm 1 is then further pivoted in the same direction to the position as shown in FIGURE 3, the resilient member 13 will be bent downwardly so that tooth 14 will disengage from aperture 16 in wiper arm 1, permitting wiper arm 1 to be pulled out of locking device 10 and aperture 4 in the back of the blade carrier.

Although my invention has been illustrated and described with reference to the preferred embodiment thereof, I wish to have it understood that it is in no way limited to the details of such embodiment, but is capable of numerous modifications within the scope of the appended claims.

Having thus fully disclosed my invention, what I claim is:

1. In a windshield wiper apparatus having a wiper arm with a locking recess therein near one end thereof, a wiper blade and a blade supporting structure including a back portion substantially closed toward the side facing away from said wiper blade and having an aperture therein for the insertion of the end of said wiper arm, and a one-piece locking member consisting of a resilient material entirely disposed within and mounted on said back portion and having an aperture in one end thereof in a position substantially coinciding with said aperture in said back portion, a locking projection on said member intermediate its ends adapted to snap into said locking recess when said wiper arm is inserted into said back portion and then into said aperture in said member, and a further projection on the other end of said member adapted to engage with the inner surface of said closed back portion when said back portion is pivoted relative to said wiper arm toward said end projection, whereby said resilient member will be bent and said locking projection will thereby be withdrawn from said locking recess in said wiper arm, permitting said wiper arm then to be withdrawn from said resilient member and said back portion.

2. A device as defined in claim 1, in which said end projection on said resilient member also serves as an abutment to limit the depth of insertion of said wiper arm into said back portion and said resilient member, so that said locking projection will then be in a position coinciding with the position of said locking recess in said wiper arm and be able to snap into said locking recess, and said wiper arm will be immovably locked to said resilient member by said two projections.

3. A device as defined in claim 1, further comprising means for pivotably mounting said resilient member within said back portion.

4. A device as defined in claim 3, in which said means comprise a pair of opposite studs integral with said resilient member and formnig pivots adapted to be inserted into a pair of opposite recesses in the side walls of said back portion.

References Cited in the file of this patent
FOREIGN PATENTS 1,048,170     Germany _____ Dec. 31, 1958